COLOR TELEVISION SYNCHRONIZATION

Filed Nov. 24, 1953 2 Sheets-Sheet 1

INVENTOR.
Vernon D. Landon
BY [signature]
ATTORNEY

COLOR TELEVISION SYNCHRONIZATION

Filed Nov. 24, 1953 2 Sheets-Sheet 2

INVENTOR.
Vernon D. Landon
BY [signature]
ATTORNEY

United States Patent Office 2,802,045
Patented Aug. 6, 1957

2,802,045

COLOR TELEVISION SYNCHRONIZATION

Vernon D. Landon, Princeton, N. J., assignor to Radio Corporation of America, a corporation of Delaware Application November 24, 1953, Serial No. 394,087

7 Claims. (Cl. 178—5.4)

The present invention relates to signalling circuits, and more particularly to color synchronization of the type employed in color television receivers.

Color television is the reproduction on the viewing screen of a receiver of not only the relative luminance or brightness, but also the color hues and saturations of the details in the original scene.

Complete cooperation between the transmitter and receiver is essential in the successful operation of television equipment. As a result much emphasis is placed on the development and utilization of synchronizing methods. This is particularly true in color television wherein not only is it necessary to maintain accurate deflection scanning but it is also necessary to maintain accurate synchronism in the timing of component color selection.

The electrical transfer of images in color may be accomplished by additive methods. Additive methods produce natural color images by breaking down the light from an object into a predetermined number of selected primary or component colors. Color images may be transferred electrically by analyzing the light from an object into not only two image elements as is accomplished by a normal scanning procedure but by also analyzing the light from elemental areas of objects or images into selected primary or component colors and thereby deriving therefrom a signal representative of each of the selected component colors. A color image may be then reproduced at a remote point by appropriate reconstruction from a component color signal train.

The transmission of television images in color involves the use of a phase and amplitude modulated subcarrier of 3.58 mc. In order to detect phase changes, the received subcarrier is compared with an oscillation of fixed phase. The fixed phase is determined by the transmission and reception of a "burst" of oscillations of subcarrier frequency at a time immediately following the horizontal deflection synchronizing signal.

There are many methods of utilizing the burst signal in the receiver for color subcarrier synchronization. One of the earliest used and one of the best known methods is that utilizing a reactance tube oscillator circuit whose output frequency and phase are compared with that of the burst using a suitable frequency and phase comparator which applies a frequency correcting voltage to the reactance tube of such magnitude as to keep the oscillator constantly in step. This synchronizing process occurs, of course, only in the brief interval following the horizontal synchronizing pulse and the circuit must have sufficient stability to maintain this frequency synchronization throughout the scanning line following the horizontal synchronizing pulse until the next horizontal synchronizing pulse appears. After this next horizontal synchronizing pulse, another synchronizing burst appears which corrects for any frequency drift which may have occurred during the preceding line.

The invention which will be described involves a reactance tube-oscillator type circuit which is a considerable improvement over the oscillator circuits utilizing the reactance tube which had been used heretofore. One of the features involved is that the circuit has inherently low color drift, and more important, the action of the reactance tube control circuit is such as to eliminate the production of spurious voltages into the reactance tube control circuit which would constitute an error in the control function of the device thereby leading to improper phase of the color subcarrier oscillator.

It is a primary object of this invention to provide an accurate color hold circuit.

It is another object of this invention to provide an oscillator circuit which may be accurately frequency and phase controlled with respect to a burst of a reference signal voltage.

It is still another object of this invention to provide a reactance tube oscillator circuit which is relatively free of spurious signals occurring during the intervals when the synchronizing burst is not applied.

According to this invention a reactance tube oscillator circuit is utilized to provide the color subcarrier wave in the color television receiver. The frequency and phase controlling voltage which is used to control the reactance tube is produced by a special phase discriminator circuit which operates push-pull from the output of the oscillator. The ends of push-pull circuit are then applied through a non-linear circuit to an electron storage network through which the synchronizing burst is applied. Because of the action of the non-linear circuit when the frequency and phase of the oscillator and the burst are not identical, a potential difference is built up across the electron charge storage device. This potential is passed through an integrating network and applied to the reactance tube to return the frequency and phase of that reactance tube to correspond with that of the synchronizing burst.

The features and aspects of the invention may be understood with reference to the following detailed description of an illustrative embodiment taken in accordance with the accompanying drawings in which.

Figure 1:
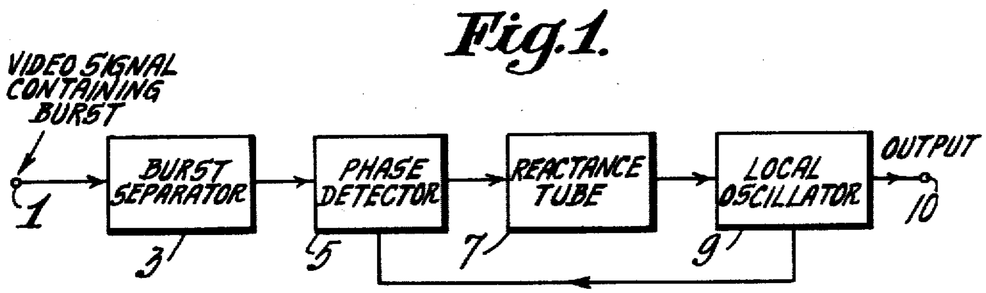
Figure 1 shows an automatic frequency control system which may be used to control the frequency of a local oscillator as compared to a video signal which contains a synchronizing burst.

In order to understand more completely the necessity for effective color synchronization, consider first the color television signal standards which follow from the NTSC specifications. The horizontal scanning frequency is a fraction of the carrier subcarrier frequency, namely $2/455$.

According to the latest version of the NTSC specifications, the absolute value of the horizontal scanning frequency is 15,734.3 C. P. S. Similarly, the vertical frequency is expressed as a fraction ($2/525$) of the horizontal scanning frequency; its absolute value is 59.92 C. P. S.

In contrast to the stricter frequency-sychronism requirements, the timing-synchronism requirements of the luminance signal are the same as for monochrome transmissions; that is, 10 microseconds for vertical timing between successive fields to avoid pairing of the interlace, and 0.06 microsecond for horizontal timing to avoid loss of horizontal resolution.

The second carrier signal in the color television signal is the color subcarrier whose value is 3.579545 mc.$\pm$11 C. P. S. The subcarrier is modulated in two ways, in phase to represent the hue, and in amplitude to represent the saturation of the colors in the scene. The color subcarrier has maximum amplitude for intense (highly saturated) colors, smaller amplitude for pastel shades (lower degrees of saturation), and zero amplitude for the zero-saturation colors (white, gray and black). The phase modulation on the color subcarrier represents hue by the phase angle of the carrier relative to a fixed reference phase.

Briefly stated, the circuits of the color television receiver compare the instantaneous phase of the color subcarrier against the fixed reference. Ultimately three color-difference signals are derived which, when applied to the picture tube in conjunction with the luminance signal, produce the hue and saturation values of the image while the luminance signal itself provides the brightness values.

Any error in the phase information recovered in the receiver produces a corresponding error in the reproduced hue. Such errors may occur due either to a shift in the fixed phase reference or to a shift in the phase of the subcarrier itself caused by noise or other disturbances.

There are, then, two factors that establish the requirements for phase synchronization of color sampling in the compatible system; (1) how much phase shift can be recognized by typical viewers as producing a noticeable shift in the hues of the image, and (2) how much noise can be tolerated before a phase shift greater than the tolerable amount is produced.

Recent tests conducted by an NTSC systems committee have indicated that a phase error of 10 degrees is tolerable, particularly if the observer has no prior knowledge of the correct hue. To be on the safe side, the NTSC is basing its investigation on a phase error of half this amount, namely 5 degrees, R. M. S. The permissible timing error corresponding to 5 degrees phase error is $\frac{5}{360}\times\frac{1}{3.58}=0.004$ microsecond. This requirement is 15 times smaller than the permissible timing error in horizontal sync.

It is customary in some color television receivers, to use a synchronizing circuit based on the block diagram shown in Figure 1, this circuit comprising in combination a burst separator 3, a phase discriminator or detector 5, and a reactance tube 7 to stabilize the 3.58 mc. local oscillator 9 connected as shown wherein the phase discriminator 5 compares the burst and the oscillator 9 signal and applies an appropriatee correction voltage to the reactance tube 7. The present invention consists of a preferential arrangement of connection and adjustment which results in superior performance. The features resulting in superior performance are as follows:

First, the point in the circuit from which the C. W. signal is fed from the oscillator to the phase discriminator is chosen as near the utilization means (samplers) as possible because phase drifts ahead of the takeoff point do not cause color error, while drifts following the takeoff point do cause color error.

Secondly, one of the circuits feeding the discriminator must be push-pull. This should be a fairly selective circuit to get a good balance through resonance. Being sharp it is subject to phase drift. This phase drift causes negligible color drift when the circuit is placed on the C. W. branch rather than the burst branch, providing the utilization takeoff point is on the same tuned circuit.

Thirdly, during the vertical sync pulse and the equalizing pulses, the burst is completely missing. If the phase discriminator draws current during this interval of time it adjusts the reactance tube bias to a wrong value during this time. This error must then be corrected during the first few lines of picture following vertical sync. However, if the phase discriminator is operated with the burst amplitude greater (by perhaps 2 to 1), than the C. W. amplitude and with suitable time constant circuits, the condition may be obtained where no current is drawn by the discriminator diode except during the bursts. This results in a much smaller tendency to drop out of sync on the first few lines of the picture. When the color oscillator is locked in and then slowly mistuned it can be detuned farther before jitter is observed at the top of the picture.

Figure 2:
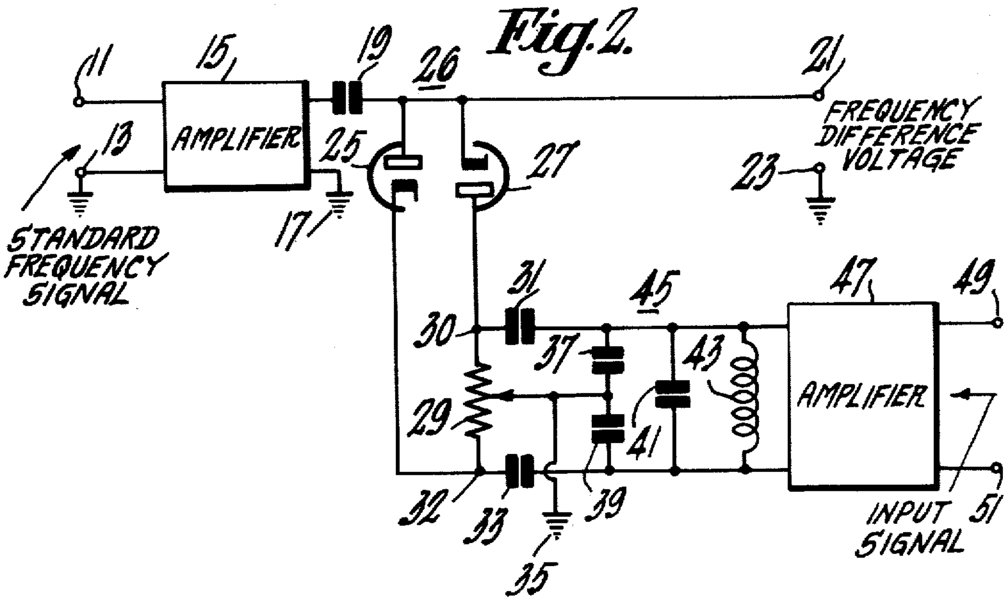
Figure 2 shows a combination block and schematic diagram of a frequency difference measuring device utilizing a novel type of phase discriminator.
Figure 3:
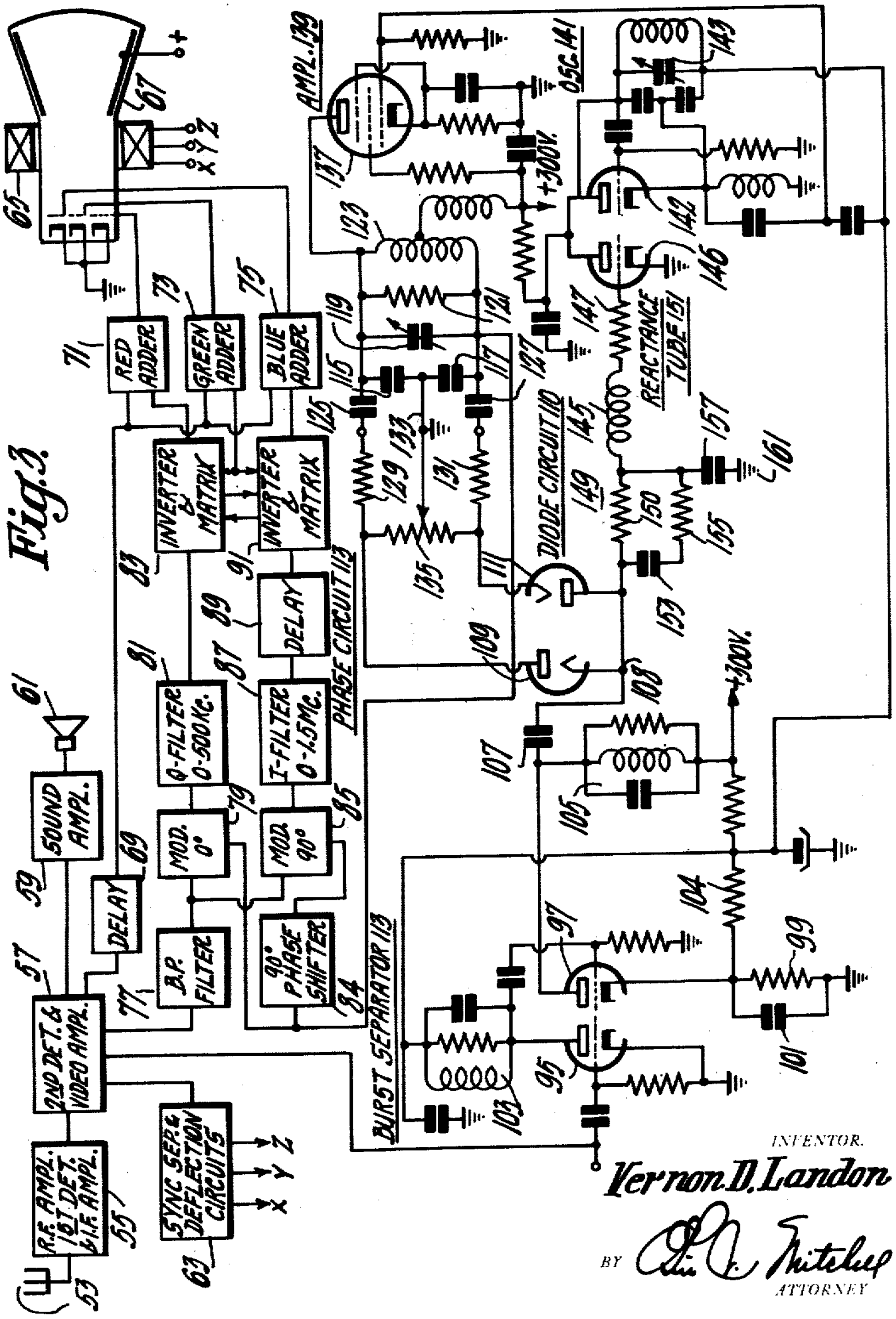
Figure 3 shows the block diagram of an RCA color television system receiver which includes the schematic diagram for the color synchronization oscillator and its associated synchronizing circuits.

Before proceeding with a description of the use of the present invention for automatic frequency control in an RCA color television receiver circuit, consider the operation of the frequency-deviation measuring circuit shown in Figure 2; the operation of this system being fundamental to the circuitry to be described in Figure 3. A standard frequency signal is applied to terminals 11 and 13 and into an amplifier 15; at the output of this amplifier, the signal is impressed through a condenser 19 onto the output terminals 21 and 23. At the same time, the signal whose phase is to be measured is impressed at the input terminals 49 and 51. This signal is amplified in the amplifier 47 and impressed across the parallel resonant circuit 45 which is made up of the inductance 43, the condenser 41, and the pair of condensers 37 and 39 in series. Note that the center point of the two condensers 37 and 39 is connected to ground. The output of this resonant circuit is 26. The diode circuit feeds through the condensers 31 and 33 to the potentiometer 29 whose end terminals 30 and 32 are connected to a diode circuit 26 consists of a pair of diodes so connected that the plate of rectifier 25 and the cathode of rectifier 27 are connected to the output terminal 21 with the cathode of rectifier 25 connected to one end of potentiometer 29 at terminal 32 and the plate of rectifier 27 connected to the other end of potentiometer 29 at the terminal 30. Consider the action of this circuit now when the standard frequency signal is momentarily turned off. As the input signal enters the terminals 49 and 51 and is impressed across the resonant circuit 45 after being amplified by amplifier 47, this alternating voltage is impressed across potentiometer 29. Simultaneously during one half of this cycle of operation of this signal, the plate of rectifier 27 is made more positive with respect to the cathode of that tube, and the cathode of rectifier 25 is made less positive with respect to the plate of that tube. Therefore, because of this intermittent action, the condenser 31 charges up to a potential nearly equal to the potential difference existing across rectifier 27 and the condenser 33 charges up to a potential nearly equal to the potential existing across rectifier 25. If the variable contact of the potentiometer 29 is centered on the potentiometer, this variable contact being connected to ground 35, then the net potential which will be delivered to the output terminal 21 will be equal to the difference in potential existing across the ends of the potentiometer at terminals 30 and 32. This potential will be zero. Should this variable contact be changed so that it is nc longer a center connection, then a potential on the output terminal 21 may be adjusted to either a near D.-C. positive voltage or a near D.-C. negative voltage, depending on the precise position of the variable connector.

Now let the standard frequency signal be impressed at the input terminals 11 and 13. This signal will pass through the amplifier 15, through the condenser 19, and serve to raise and lower the plate of rectifier 25 and the cathode of 27 at a rate determined by the repetition frequency. It is evident that due to the input signal to terminals 49 and 51, the cathode of rectifier 25 and the plate of rectifier 27 are varied exactly 180° out of phase. Let the standard frequency signal then be 90° in phase leading the voltage appearing across rectifier 25 and 90° in phase lagging the voltage appearing across rectifier 27. Then the potential across rectifier 25 will be raised an equal amount to that which will be caused to exist across rectifier 27. And therefore, the output potential existing at terminal 21 will still be zero. However, let the phase of the standard reference frequency signal be shifted such that its phase position is no longer half way between the phases of the voltages existing across rectifiers 25 and 27. For one direction of phase shift the potential across rectifier 25 will be increased and the potential across rectifier 27 will be decreased. This will result in a variation of the charges existing across condensers 31 and 33, but since the potential difference across the two halves of the potentiometer 29 must be equal when the variable contact is centered, then this difference in potential differences which exist across the two rectifiers 25 and 27 manifests itself in a change in charge across condenser 19. Therefore, a voltage will exist between the output terminal 21 and ground terminal 23 which is a function of the difference in phase between the input signal and the standard frequency signal as measured from the phase position where the standard frequency signal phase is midway between the phase of the potential variations existing across rectifiers 25 and 27. Therefore, the voltage difference occurring between output terminal 21 and ground terminal 23, as plotted against phase deviation, will be a conventional discriminator characteristic curve. Note too that by shifting the variable contact of the potentiometer 29 a bias voltage can also be made to exist between the output terminal 21 and the ground terminal 23.

Consider now the application of the basic circuit shown in Figure 2 to the color television system which is shown in Figure 3.

The basic operations performed in a compatible color receiver are described as follows: The antenna 53, R. F. amplifier, first detector and I. F. amplifier 55, and second detector and video amplifier 57 serve the same functions as the corresponding components of a black-and-white receiver. For a detailed description of the operation of these operations see A. Wright, "Television receivers," RCA Review, vol. 8, No. 1, March 1947. The sound signal may be obtained from the output of the second detector by using the well-known "intercarrier sound" principle and passed through the sound amplifier 59 from which it is applied to the speaker 61. The video signal obtained from the second detector of the receiver is, for all practical purposes, the same signal that left the color television studio. The receiver up to this point is no different from a black-and-white receiver except that the tolerance limits on performance are somewhat tighter.

The signal from the second detector is utilized in four circuit branches. One circuit branch directs the complete signal through a delay line 69 toward the color kinescope 67 where it is used to control luminance by being applied to the red adder 71, green adder 73, and blue adder 75. In the second circuit, a bandpass filter 77 separates the high-frequency components of the signal (roughly 2.0 to 4.1 mc.) consisting mainly of the two-phase modulated subcarrier signal. This signal is applied to a pair of modulators 79 and 85 which operate as synchronous detectors to recover the original I and Q signals. It should be noted that those frequency components of the luminance signal falling between about 2 and 4.1 mc. are also applied to the modulators, and are heterodyned down to lower frequencies. These frequency components do not cause objectionable interference, however, because they are frequency-interlaced and tend to cancel out through the persistence of vision.

The remaining branch at the output of the second detector 57 makes use of the timing or synchronizing information in the signal. A sync separator 63 is used to produce the pulses needed to control the horizontal and vertical deflection circuits 63. The high voltage supply for the kinescope may be obtained either from a "flyback" supply associated with the horizontal deflection circuit or from an independent R. F. power supply. Many color kinescopes require convergence signals to enable the scanning beams to coincide at the screen in all parts of the picture area; the waveforms required for this purpose are derived from the deflection circuits.

The final branch at the output of the second detector is the burst separator 113. The separated bursts are amplified and compared with the output of a local oscillator 141 in a phase detector. If there is a phase difference between the output of the local oscillator 141 and the bursts, an error voltage is developed by the phase detector. This error voltage restores the oscillator to the correct phase by means of a reactance tube 151 connected in parallel with the oscillator's tuned circuit. The automatic-frequency-control circuit keeps the receiver oscillator in synchronism with the master subcarrier oscillator at the transmitter. The output of the oscillator provides the reference carriers for the two synchronous detectors 79 and 85; a 90° phase shifter 84 is necessary to delay the phase of the Q modulator by 90° relative to the I modulator. The M, I and Q signals are all passed through filters in order to separate the desired signals from other frequency components which, if unimpeded, might cause spurious effects. The I and Q signals are passed through the I-filter 87 and Q-filter 81 respectively whose respective bandwidths are nominally 1.5 and .5 mc.

Following the filter section in the receiver there is a matrix section in which the M, I and Q signals are cross-mixed to recreate the original R, G, B signals. The R, G, B signals at the receiver are not identical to those at the transmitter because the higher frequency components are mixed, and are common to all three channels. This mixing is justifiable, because the eye cannot perceive the fine detail (conveyed by the high-frequency components) in color. For ease of analysis, the matrix operations at the receiver may be considered in two stages. The I and Q signals are first cross-mixed to produce R—M, G—M, and B—M signals (note that negative I and Q signals are required in some cases), which are, in turn, added to M to produce R, G, and B.

In the output section of the receiver, the signals are amplified to the level necessary to drive the kinescope 67, and the D. C. component is restored. The image which appears on the color kinescope screen is a high-quality, full-color image of the scene before the color camera.

Consider now the action of the entire automatic-frequency-control circuit which is used to stabilize the frequency of the output of the color synchronizing oscillator 141 shown in Figure 3 as compared to the burst signal which follows the horizontal synchronizing pulse in a color television signal. Unlike many systems which employ elaborate gating and keying methods to separate the burst from the video signal, the burst is separated in the circuit shown in Figure 3 by using a circuit which is not a gating circuit but fundamentally a double class C amplifier which operates as follows. The video signal including the burst is applied to the grid of tube 95 which, since the cathode is connected to ground, produces a certain amount of clipping of the burst signal in the grid circuit which therefore produces a complex waveform at the burst frequency and during the burst interval, in the resonant circuit 103 which is tuned to the frequency of the burst. The signal appearing across this resonant circuit 103 is then applied to the grid of tube 97. By use of a resistance divider network using resistors 104 and 99 and condenser 101, the grid is biased negatively beyond cutoff so that tube 97 operates in true class C amplifier fashion. As the electrical oscillations appearing across resonant circuit 103 are impressed on the grid of 97, then during the fraction of a cycle which the grid is driven above cutoff, plate current will pass through the resonant circuit 105, which is also tuned to the burst signal frequency. Because of class C amplifier action, this plate current will be in the form of intervals of current having a waveform resembling that of a rectified sine wave and having a duration period less than half a cycle of the burst signal frequency. These intervals of current will excite the output resonant circuit 105 at the time when the burst is appearing and indeed shortly afterward until the oscillations have died down in circuit 105 and thus the burst separator 113 serves as an effective system for separating the burst from the video signal. This burst will pass through condenser 107 and be impressed at the terminal 108 which corresponds to the terminal 21 in Figure 2.

Consider now the remainder of the circuit. The oscillator circuit 141 is a circuit using electron tube 142 in whose plate circuit is the resonant circuit 143, which is tuned to the color synchronizing burst frequency. By utilizing a small portion of the voltage developed across this resonant circuit 143 in the cathode circuit of tube 142, the tube circuit will operate as a stable and an efficient oscillator. The output of the oscillator is impressed on an amplifier circuit 139 using vacuum tube 137; the output of amplifier circuit 139 is then impressed on the phase circuit 113 which utilizes the diode circuit 110. The operation of this circuit is identical to that of the circuit described in Figure 2 with the minor exception that the resistors 129 and 131 have been added to restrict the range afforded by the variable contact on the potentiometer 135 which is in the phase circuit 113. It is evident from the description of the circuit previously described in Figure 2 that a voltage will appear between terminal 108 and any ground connection which will be a function of the difference in phase between the burst signal and the output of the oscillator 141. However, this burst signal lasts for a very short period of time, and since it is desirable to have a continuous voltage which is a function of deviation from zero phase position rather than the pulse which will be yielded during the duration of the burst signal, it is convenient to use a simple integrating circuit 149 consisting principally of the resistor 150 and the condenser 157. It is well known that the potential which exists across any condenser is described by the following relationship $$e_c=\frac{1}{C}\int idt$$

where $e_c$ is the voltage appearing across the condenser, C is the capacitance of the condenser, and $i$ is the current which passes through the condenser. It is evident that the condenser has the property of integrating the current which goes through it, as a function of time. By choosing the proper constants for the resistor 150 and the condenser 157 and by employing a phase shifting network consisting of a resistor 155 and condenser 153 the pulse output of the phase and diode circuits 113 and 110 respectively is easily transformed into a continuous voltage whose amplitude is a function of the deviation in phase of the output of the oscillator 141 from the burst signal. What now remains is the utilization of this reference voltage for controlling the frequency of the oscillator in order to bring it into synchronism with the phase and frequency of the burst signal. This is accomplished by utilizing the reactance tube circuit 151 involving the tube 146. In general, a reactance tube operates using the following basic principle. The output current of the reactance tube is permitted to pass through the resonant circuit whose frequency and phase are to be altered. By utilizing a suitable phase shifting network the voltage between grid and cathode of the reactance tube is adjusted to be 90° out of phase with respect to that of the voltage appearing across the resonant circuit to be altered; whether this 90° out-of-phase voltage leads or lags is dependent upon whether an inductive or capacitive effect is desired. The effect of using this out-of-phase voltage on the grid is to induce out-of-phase currents in the resonant circuit and thereby cause a change in reactance in that circuit thereby changing the frequency and phase to an extent dependent upon the phase and magnitude of the out-of-phase currents. For an extensive description of how these circuits should operate, see, for example, Chapter 13 of C. Louis Cuccia "Harmonics, Sidebands and Transients in Communication Engineering," McGraw-Hill Book Co., Inc., 1952. At the very high frequencies such as that frequency at which the color synchronizing signal is sent, it is convenient to in most color television receiver circuits use reactance tubes based on a circuit such as that utilized in circuit 151 in Figure 3. Here the input signal to the grid circuit is impressed across a series circuit consisting of the inductance 145, the resistor 147 and the grid-to-cathode capacitance of the tube 146. By suitable choice of the size of the inductance and resistor, the voltage appearing between grid and cathode of tube 146 is 90° out-of-phase with respect to the plate voltage. The integrating circuit 149 will then deliver a continuous D.-C. voltage to the grid circuit of the reactance tube which will serve to control the transconductance of the tube 146, this change in transconductance serving as a control of the reactance afforded by the reactance tube 151 which is then used to control the frequency and phase of the oscillator 141. Other characteristics of the automatic-frequency-control circuit which enhance its usefulness arise from the following consideration. The plate voltage of the reactance tube 151 is only 90 volts. This and the sharp cutoff characteristics of the 12AT7 which is used as the tube 146 makes the variations of grid bias effective only over a narrow range of values. Thus the control curve is steep but of limited extent. Also the potentiometer 135 is used as a bias adjustment on the reactance tube 151. It should be used to bias the reactance tube 151 to the center of a characteristic curve with the local oscillator input to the phase discriminator shorted. With the burts signal applied with the local oscillator signal then reapplied and with the oscillator locked, this circuit will stay locked in phase in over a very large range of the oscillator tuning control. As this control is varied over this range the reactance tube bias changes over the operating region. This oscillator control is then adjusted at the setting which results in normal bias for the reactance tube.

Although the invention has been described relating to a specific embodiment, numerous other arrangements may be devised by those skilled in the art without departing from the spirit and scope of the invention.

Having described the invention, what is claimed is:

1. A color television receiver system of the type employing color television video signals containing a color synchronizing burst the frequency of which is employed for color selection, an oscillator, frequency and phase control means coupled to said oscillator responsive to a control voltage, a burst separator to separate said bursts from said video signal, a phase discriminator having two rectifiers and two input circuits for phase comparison of said burst and said oscillator signal and being push-pull on one input circuit and single ended on the other input circuit, means for coupling said oscillator to said push-pull input circuit of said phase discriminator, means for coupling said separated burst signal to the single ended input circuit of said phase discriminator to yield a phase discriminator pulse output voltage proportional to difference in phase between said color synchronizing burst and a signal from said oscillator, an integrating circuit, means for passing said pulse output voltage through said integrator circuit to produce a continuous voltage proportional to said phase difference, means for utilizing output of said integrating circuit in said frequency and phase control means to keep said oscillator in synchronism with said color synchronizing burst, and means for utilizing the output signal of said oscillator in said color television receiver circuit.

2. A color television receiver system of the type employing a color synchronizing burst contained in the video signal, the frequency and phase of which is employed for color selection comprising in combination, an oscillator tuned substantially to the burst frequency, a frequency and phase control means coupled to said oscillator for controlling the frequency and phase of said oscillator subject to a control voltage, a symmetrical dissipative electron charge storage network center tapped to a point of fixed potential, means for developing the output of said oscillator across said dissipative electron charge storage network, a potentiometer having an adjustable tap which is connected to said point of fixed potential, capacity means for connecting said potentiometer across said dissipative electron charge storage network, a pair of switches, means for closing said switches only during one half of each cycle of oscillation of said oscillator, a reference terminal, means including said switches for intermittently connecting the ends of said potentiometer to said reference terminal thereby establishing a potential at said reference terminal dependent upon the setting of said adjustable tap and the output of said oscillator and the time constants of said dissipative electron charge storage network a burst separator to separate said bursts from said video signal, a non-dissipative electron charge storage network, means for coupling said separated burst through said non-dissipative electron charge storage network to said reference terminal thereby raising and lowering the potential of said switches and developing a pulse voltage across said non-dissipative electron storage network and across said reference terminal proportional to the difference in phase and frequency between the output signal of said oscillator and said burst, an integrating circuit, means for coupling said pulse voltage to said integrating circuit to produce a continuous voltage at output of said integrating circuit proportional to said frequency and phase differences, means for applying said continuous voltage to said frequency and phase control means to bring oscillator into synchronism with said burst, and means for utilizing output of said oscillator in said color television receiver.

3. In a color television receiver system of the type employing color television video signals containing a color synchronizing burst, the frequency and phase of which is employed for color selection, a color synchronizing circuit comprising in combination, an oscillator tuned to the burst frequency, a reactance tube means coupled to said oscillator for controlling the frequency and phase of said oscillator, said reactance tube means responsive to a control voltage, an electron tube amplifier having an input circuit and an output resonant circuit, means for coupling the output of said oscillator to said input circuit of said electron tube amplifier, a condenser voltage divider having a center tap, means for connecting said center tap to a point of fixed potential, means for placing said condenser voltage divided in shunt with said output resonant circuit, a potentiometer having a variable contact, capacity means for connecting said potentiometer in shunt with said output resonant circuit, means to couple said variable contact to a point of fixed potential, means for adjusting the frequency of the total resonant circuit comprising said output resonant circuit, said condenser voltage divider and said capacity coupled potentiometer to the frequency of said oscillator, a reference terminal, a first rectifier tube and a second rectifier tube each having an anode and a cathode, means for connecting cathode of said first rectifier tube to one end of said potentiometer, means for connecting anode of said second reactance tube to other end of said potentiometer, means for connecting both the anode of said first rectifier tube and cathode of said second rectifier tube to said reference terminal to clamp said reference terminal to a D.-C. potential dependent upon setting of said variable contact and the magnitude of oscillations developed across said total resonant circuit, said rectifiers acting as a clamp circuit simultaneously during one half of every cycle of said oscillator, a burst separation circuit having an input and consisting of two class C amplifiers connected in cascade, means for connecting the source of said color television video signal to the input to said burst separator, capacity coupling means for coupling the output of said burst separator to said reference terminal such that during said burst to cause said burst to raise and lower the potential of said anode of said first rectifier tube and said cathode of said second rectifier tube in accordance with burst amplitude and phase to produce a difference of potential across said capacity coupling means, an integrating circuit, means for utilizing said integrating circuit for converting said difference of potential developed across said capacity coupling means during each burst to a continuous potential whose magnitude is also proportional to difference in phase and frequency between said burst and the output of said oscillator, means for utilizing said continuous potential to control said reactance tube, and means for utilizing output of said oscillator in said color television receiver circuit.

4. The invention as set forth in claim 3 and wherein said variable contact is adjusted to provide for correct D.-C. bias of said reactance tube.

5. The invention as set forth in claim 3 and wherein amplitude of the burst signal at the said reference point is greater than amplitude of the signal impressed across total resonant circuit at the output of said amplifier coupled to said oscillator thereby creating the condition whereby negligible current is drawn by said first rectifier tube and said second rectifier tube during time intervals other than during bursts.

6. In a color television receiver the combination of: a source of intermittent color synchronizing bursts having a reference phase; a phase controllable signal source having at least a phase control terminal responsive to an applied signal; a first and second rectifier each having an anode and a cathode; means for coupling the anode of said first rectifier and the cathode of said second rectifier together to form a common terminal; push-pull circuit means responsive to the output of said signal source to operatively drive the cathode of said first rectifier and the anode of said second rectifier in push-pull with opposite phases of the output of said signal source; integrating circuit means coupled to said common terminal; means for coupling said source of color synchronizing bursts to said common terminal; means for coupling said control signal to develop across said integrating circuit means a control signal indicative of the phase difference between said bursts and the output of said signal source to said phase control terminal of said phase controllable signal source to control the phase of said signal source.

7. In a color television receiver adapted to receive a color television signal including color synchronizing bursts having prescribed frequency and phase, the combination of: means to develop a first color reference signal having the phase and frequency of said bursts; a source of a pair of 180° out of phase second color reference signals describing a second phase and frequency; reference terminal; means for coupling said first color reference signal source to said reference terminal; nonlinear impedance means responsive to the instantaneous amplitude of said first color reference signal developed at said reference terminal for translating prescribed intervals and signal levels of both of said pair of 180° out of phase second color reference signals to said reference terminal; signal developing means responsive to the translation of said pair of 180° out of phase second color reference signals through said nonlinear impedance means according to signal levels controlled by the instantaneous amplitude of said first color reference signal to develop a control voltage which is indicative of the frequency and phase relationship between the first phase and frequency described by said first color reference signal and the second phase and frequency described by said pair of 180° out of phase second color signals; and means responsive to said control voltage to control the frequency and phase of said source of said pair of 180° out of phase second color reference signals.

References Cited in the file of this patent

UNITED STATES PATENTS

| | | |
|---|---|---|
| 2,318,197 | Clark | May 4, 1943 |
| 2,396,688 | Crosby | Mar. 19, 1946 |
| 2,496,073 | Mural | Jan. 31, 1950 |
| 2,610,297 | Leed | Sept. 9, 1952 |
| 2,644,030 | Moore | June 30, 1953 |
| 2,666,136 | Carpenter | Jan. 12, 1954 |

OTHER REFERENCES

Two-Color Direct View Television, RCA, November 1949.

UNITED STATES PATENT OFFICE

Certificate of Correction

Patent No. 2,802,045

August 6, 1957

Vernon D. Landon

It is hereby certified that error appears in the printed specification of the above numbered patent requiring correction and that the said Letters Patent should read as corrected below.

Column 4, line 18, strike out "is 26. The diode circuit"; line 20, after "diode circuit" insert —26. The diode circuit—; column 9, line 57, after "cycle" insert —of oscillation—; column 10, line 40, after "frequency;" insert —a—; line 67, list of references cited, under "UNITED STATES PATENTS", for "2,496,073" read —2,496,063—.

Signed and sealed this 17th day of September 1957.

[SEAL]

Attest:

KARL H. AXLINE,
*Attesting Officer.*

ROBERT C. WATSON,
*Commissioner of Patents.*